US011805068B2

(12) United States Patent
Liang et al.

(10) Patent No.: US 11,805,068 B2
(45) Date of Patent: Oct. 31, 2023

(54) SELECTIVE DELAYING OF PROVISIONING, TO ASSISTANT DEVICE(S), ASSISTANT DATA THAT IS LOCALLY UTILIZABLE BY A CORRESPONDING LOCAL ASSISTANT CLIENT

(71) Applicant: GOOGLE LLC, Mountain View, CA (US)

(72) Inventors: Benedict Liang, New York, NY (US); Bryan Christopher Horling, Belmont, MA (US); Lan Huo, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 10 days.

(21) Appl. No.: 17/187,199

(22) Filed: Feb. 26, 2021

(65) Prior Publication Data
US 2022/0272048 A1 Aug. 25, 2022

Related U.S. Application Data

(60) Provisional application No. 63/152,677, filed on Feb. 23, 2021.

(51) Int. Cl.
*H04L 47/726* (2022.01)
*G06F 16/23* (2019.01)
(Continued)

(52) U.S. Cl.
CPC ........ *H04L 47/726* (2013.01); *G06F 16/2358* (2019.01); *H04L 47/52* (2013.01); *H04L 47/6255* (2013.01)

(58) Field of Classification Search
CPC ......... H04L 67/55; H04L 67/51; H04L 67/10; H04L 41/509; H04L 67/60; H04L 41/12;
(Continued)

(56) References Cited

U.S. PATENT DOCUMENTS 11,087,739 B1\* 8/2021 Rastrow ................ G06F 40/216
2005/0272452 A1\* 12/2005 Khoury ................. H04L 51/224
455/466

(Continued)

FOREIGN PATENT DOCUMENTS

CN 111078245 4/2020

OTHER PUBLICATIONS

Free eBOOK; Learning Google-Cloud-Messaging; https//riptutorial.com/ebook/google-cloud-messaging; 12 pages; retrieved Nov. 9, 2020.

*Primary Examiner* — Djenane M Bayard
(74) *Attorney, Agent, or Firm* — Gray Ice Higdon

(57) ABSTRACT

Implementations set forth herein relate to conditionally delaying fulfillment of client update requests in order to preserve network bandwidth and other resources that may be consumed when an ecosystem of linked assistant devices are repeatedly pinging servers for updates. In some implementations, a server device can delay and/or bypass fulfillment of a client request based on one or more indications that certain requested data is currently, or is expected to be, expired. For example, a user that is modifying assistant settings via a cellular device can cause an update notification to be pushed to several other assistant devices before the user finishes editing the assistant settings. Implementations herein can limit fulfillment of update requests from the client devices according to certain criteria—such as whether the user is continuing to modify the assistant settings from their cellular device.

20 Claims, 8 Drawing Sheets

(51) Int. Cl.
*H04L 47/625* (2022.01)
*H04L 47/52* (2022.01)

(58) Field of Classification Search
CPC ............ H04L 41/0813; H04L 41/0823; H04L 41/0869; H04L 41/50; H04L 43/04; H04L 43/08; H04L 43/10; H04L 67/568; H04L 41/5041; H04L 61/4511; H04L 65/60; H04L 67/06; H04L 67/2885; H04L 67/289; H04L 67/5682; H04L 41/0816; H04L 41/0893; H04L 47/70; H04L 61/10; H04L 61/2503; H04L 61/4535; H04L 61/58; H04L 65/403; H04L 67/01; H04L 67/1078; H04L 12/282; H04L 67/306; H04L 67/535; H04L 67/12; H04L 63/0861; H04L 67/125; H04L 2209/80; H04L 51/02; H04L 63/102; H04L 9/0618; H04L 9/3231; H04L 67/303; H04L 12/2825; H04L 12/2816; H04L 67/02; H04L 67/141; H04L 63/0428; H04L 63/083; H04L 65/1059; H04L 65/4015; H04L 65/612; H04L 65/762; H04L 67/1095; H04L 9/0825; H04L 9/088; H04L 12/2818; H04L 51/224; H04L 63/08; H04L 63/0853; H04L 63/101; H04L 67/52; H04L 67/61; H04L 2209/46; H04L 47/52; H04L 47/6255; H04L 47/726; H04L 51/07; H04L 51/222; H04L 63/107; H04L 67/14; H04L 67/30; H04L 67/63; H04L 69/329; H04L 9/0643; H04L 9/0841; H04L 9/085; H04L 9/40; H04L 9/3239; H04L 9/50; H04L 2209/56; H04L 9/0637; H04L 9/3247; H04L 9/3297; H04L 9/3236; H04L 63/12; H04L 9/3218; H04L 9/3221; H04L 45/04; H04L 67/104; H04L 27/26025; H04L 43/00; H04L 43/0852; H04L 45/02; H04L 45/023; H04L 45/033; H04L 5/0057; H04L 63/0823; H04L 63/0442; H04L 63/123; H04L 67/133; H04L 41/082; H04L 41/40; H04L 41/5025; H04L 41/5051; H04L 63/0807; H04L 67/1076; H04L 67/1097; H04L 67/34; H04L 9/006; H04L 9/0662; H04L 9/0891; H04L 9/3215; H04L 9/3242; H04L 63/1458; G06F 21/64; G06F 16/27; G06F 16/137; G06F 16/1834; G06F 16/1837; G06F 16/2358; G06F 16/248; G06F 40/174; G06F 40/186; G06F 16/256; G06F 16/957; G06F 21/602; G06F 16/1805; G06F 16/9024; G06F 16/9535; G06F 21/6218; G06F 21/6245; G06F 21/6281; G06F 2221/0746; G06F 16/587; G06F 16/9038

See application file for complete search history.

(56) References Cited

U.S. PATENT DOCUMENTS

| | | | | |
|---|---|---|---|---|
| 2010/0332682 | A1* | 12/2010 | Sharp | H04W 4/60 709/248 |
| 2012/0147840 | A1* | 6/2012 | Chen | H04L 1/1854 370/329 |
| 2013/0179791 | A1 | 7/2013 | Polski et al. | |
| 2013/0346589 | A1 | 12/2013 | Leshko et al. | |
| 2015/0261782 | A1* | 9/2015 | McFerrin | G06F 3/06 707/625 |
| 2021/0060429 | A1* | 3/2021 | Juenger | G06F 3/0482 |

* cited by examiner

SELECTIVE DELAYING OF PROVISIONING, TO ASSISTANT DEVICE(S), ASSISTANT DATA THAT IS LOCALLY UTILIZABLE BY A CORRESPONDING LOCAL ASSISTANT CLIENT

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

In some instances, a user can interact with an automated assistant through any assistant device of an ecosystem of assistant devices. An ecosystem of assistant devices can refer to one or more devices that each include a local assistant client application and that are each associated with a corresponding assistant account that is controlled by one or more users. This ecosystem of assistant devices can include portable assistant device(s) that the user carries with them as they travel, home assistant device(s) that remain in different rooms of their home or other structure, and/or in-vehicle device(s).

In order to ensure that interactions between the automated assistant and the user are consistent across the ecosystem of assistant devices, a cloud service of the automated assistant can push updates to various assistant-enabled devices. An update can, for example, reflect a user change to assistant-related setting(s), an explicit or inferred update to preference(s) of the user, a creation and/or modification to a file by the user, and/or other explicit or inferred changes or updates that are based on user interface input(s) and/or other interactions of the user.

In many situations, all push updates will be proactively pushed, by the cloud service to the assistant devices, as soon as possible. Such prompt provisioning of the push updates can result in unnecessary utilization of hardware resources of the cloud service, network resources, and/or hardware resources of assistant device(s).

As one example, some push updates will become stale shortly after they are provided, necessitating providing of another push update to supplant or supplement the previously provided push update. This can cause needless consumption resources cloud service, network, and/or assistant-enabled device(s) as the initial push updates are effectively wasted. As another example, needless spikes in utilization of hardware resources of the cloud service and/or in utilization of network resources can occur during spikes in "as soon as possible" provisioning of the push updates. This can necessitate over-specification and inefficient use of hardware resources of the cloud service to accommodate spikes and/or can result in network congestion during spikes. As yet another example, "as soon as possible" pushing of the update can impact ongoing processes on assistant device(s) as resource(s) of those device(s) must be used to process the pushed update.

SUMMARY

Implementations set forth herein relate to conditionally determining, by assistant server device(s), whether and/or when to distribute assistant data to assistant device(s). Instead of always immediately pushing assistant data to assistant device(s), implementations disclosed herein can selectively delay the providing of at least some assistant data to assistant device(s) and/or determine not to provide at least some assistant data to assistant device(s). By selectively delaying the providing of at least some assistant data to assistant device(s), the server device(s) can better balance the load on hardware resources of the server devices and/or can prevent overburdening of network resources. For example, providing of certain types of assistant data can be delayed and instead provided during time(s) when server and/or network resources are not overburdened. Further, this can enable other types of certain assistant data, that is determined to be provided without delay, to be provided more quickly in view of delaying of the certain types of assistant data lessening the immediate strain on server and network resources. Moreover, when providing of certain assistant data is delayed, in some situations updated assistant data, that supplants or supplements the certain assistant data, can be later identified by the assistant server(s) (later relative to the identification of the certain assistant data). In some of those implementations, the server device(s) can determine not to provide the certain assistant data and to instead send alternate data that is based at least in part on the later identified updated assistant data. This results in not providing the certain assistant data and can reduce a quantity of data transmitted from the server device(s) to the assistant device(s) and/or reduce a quantity of transmissions (e.g., only the alternate data is sent instead of both the certain assistant data and the updated assistant data being sent).

Various implementations can additionally or alternatively, instead of proactively pushing assistant data to assistant devices, at least selectively initially provide a corresponding notification to the assistant devices. The notifications can each indicate that updated assistant data is available for retrieval from the assistant server device(s) and can optionally include a timestamp and/or identifier(s) of the assistant data. Responsive to receiving a notification, an assistant device can determine when to send, to the assistant server(s), a request that is based on that notification. For example, the assistant device can send the request immediately, or can choose to delay sending of the request until certain condition(s) are satisfied. For instance, the assistant device can choose to delay sending of the request until a state of charge of its battery satisfies a threshold, until it is not actively processing user request(s), until a threshold duration of time has passed since an assistant was last invoked by a user via the assistant device, until certain network conditions are present, and/or until other condition(s) are satisfied. In these and other manners, the assistant devices can determine when the assistant data is retrieved, thereby preventing forced receipt of assistant data in situations where such receipt would negatively impact limited battery life of the assistant device, utilization of limited hardware resources of the assistant device, limited network resources, and/or have other negative impact(s).

The request sent by the assistant device can include the timestamp and/or the identifier(s) of the assistant data. Responsive to receiving the request, the assistant server(s) can utilize the timestamp and/or the identifier(s) to identify the assistant data, and send the assistant data to the assistant device responsive to the request. Optionally, the assistant server(s) can, prior to sending the assistant data, utilize the timestamp and/or the identifier(s) to ensure the assistant data is not stale (e.g., having since been supplanted or supplemented with updated assistant data). If the assistant server(s)

determine the assistant data is not stale, they can provide the assistant data responsive to the request. If, instead, the assistant server(s) determine the assistant data is stale, they will not send the assistant data responsive to the request. Instead, the assistant server(s) can determine to not respond to the request, determine to respond with an indication that the assistant data is no longer available, or determine to respond with the updated assistant data. If the assistant server(s) do not respond with the updated assistant data, they can later send a notification that is directed to the updated assistant data. In these and other manners, the assistant server(s) can prevent the sending of stale assistant data, in situations where the assistant was recognized to be stale subsequent to sending of the initial notification related to the assistant data.

As one example, assume first assistant data that reflects a change in privacy settings for a user, that is generated responsive to user interface input(s) of the user within a settings interface of the assistant application, and that when provided to a corresponding assistant device effectuates one or more changes to conform with the privacy settings change. Further assume second assistant data that reflects a change to the synthesized voice to be used by the assistant in responding to a user, that is generated responsive to user interface input(s) of the user within the settings interface, and that when provided to a corresponding assistant device causes responses provided by the assistant device to be provided in a particular synthesized voice that is different that a currently utilized synthesized voice. Further assume third assistant data that includes data about one or more entities and that can be used to enable local fulfillment, that is generated responsive to searching and/or other interaction(s) by the user that are related to those entities, and that when provided to a corresponding assistant device can be utilized by local assistant components (e.g., a natural language understanding component and/or a fulfillment component) in interpreting and/or responding to an assistant request. The first assistant data, the second assistant data, and the third assistant data can be generated at different times and/or identified by assistant server(s) at different times.

In such an example, the assistant server(s) can determine to immediately provide, to assistant device(s) of the user, first notifications for the first assistant data. The determination to immediately provide the first notifications can be based on, for example, the first assistant data effectuating privacy changes when provided to the assistant devices. The assistant server(s) can determine to delay providing, to assistant device(s) of the user, second notifications for the second assistant data. For example, the delay can be until a next occurrence of actual or anticipated server load falling below a threshold. Such a delay can be determined based on, for example, the second assistant data effectuating human perceivable changes to the assistant, but not relating to privacy. Put another way, the delay can cause providing the second notification to be prioritized, but not prioritized over privacy related notifications that need to be provided to various assistant devices. The assistant server(s) can determine to delay providing, to assistant device(s) of the user, third notifications for the third assistant data—and can delay the third notification to a greater extent than the second. For example, the third notification can be delayed five minutes, ten minutes, two hours, or other duration of time to ensure that updated data that supplants or supplements the third assistant data is not received within that duration (in which case the third notification will not be sent). As another example, the third notification can be delayed until cessation of an ongoing search session, browsing session, or other session that resulted in generation of the third assistant data—or until passage of a duration of time following such cessation.

Oftentimes, interactions between a user and an automated assistant can result in the generation of assistant data, which can be used by various assistant devices in order to provide meaningful content to a user. For example, an interaction profile for a particular user can indicate sources of content that the user may be interested in during an interaction with the automated assistant. When a source of content is associated with a user profile, this can indicate that the user is expected to request that the automated assistant access the source of content during a subsequent interaction. As a result, a server device associated with the automated assistant can push notifications to various assistant devices of an ecosystem of devices to put them on notice that an updated user profile is available. Thereafter, each respective assistant device can request updated assistant data from the server device in order to prepare for any forthcoming interactions with the user. However, in some instances, the server device may prematurely send updated assistant data, particularly when an interaction between the user and the automated assistant is ongoing. For example, notification data regarding a source of information that the user may be interested in can be rendered irrelevant as the user identifies additional search parameters during an interaction with the automated system. When such notifications are provided to an ecosystem assistant devices on a regular basis, significant network bandwidth and processing bandwidth can be consumed on notifications that quickly become irrelevant.

In order to preserve computational resources that might otherwise be wasted in this way, assistant data and/or other related data can be selectively pushed to client devices according to one or more criteria. For example, when a server device determines that updated assistant data is available, the server device or other computing device can determine whether one or more characteristics of the updated assistant data satisfy the one or more criteria. In some implementations, the criteria can include temporal criteria that limits communicating assistant data, or notifications about the assistant data, to client devices based on one or more temporal aspects of the updated assistant data that is available. For example, a client device of a device ecosystem can be notified of changes to user interaction preferences when the user participates in an interaction with the automated assistant but then suspends the interaction for at least a threshold amount of time. A user interaction preference can refer to data that has been accessed and/or generated during an interaction between the user and the automated assistant. In some implementations, user interaction preferences can correspond to data that can be used by a client automated assistant in order to bias local automatic speech recognition (ASR) and/or natural language understanding (NLU) towards particular terms, parameters, entities, intents, and/or any other terms that can be used for providing instructions to an application. Alternatively, or additionally, the client devices can be notified of changes to user security preferences when the user is interacting with an interface containing security settings and then suspends the interaction for a different threshold amount of time. For example, the threshold amount of time corresponding to notifications regarding user interaction preferences can be longer than the other threshold amount of time corresponding to other notifications regarding user security preferences.

In some implementations, a server device can generate and/or receive assistant data that various client devices of an ecosystem can use in order to provide more robust features for their respective client automated assistants. For example, updated assistant data can be available when a third-party application provides data that is associated with a user who also has an assistant account. In response to determining that the updated system data is available, the server device can provide a notification to client devices in the ecosystem associated with the assistant account. However, when the client devices respond to the notification by attempting to retrieve the updated assistant data from the server device, the server device can optionally delay providing the updated assistant data to the client devices according to whether one or more criteria are satisfied. For example, in some implementations, the one or more criteria can be based on one or more metrics that characterize one or more operating conditions of the server device and/or the client devices of the ecosystem. For instance, an operating metric of the one or more metrics can characterize a current computational load and/or a predicted computational load of the server device, and the server device can limit responding to certain requests from the client devices until the computational load metric satisfies a particular operating metric threshold. Alternatively, or additionally, an operating metric of the one or more metrics can characterize a network load of the server device and/or associated client devices, and the server device can limit responding to a certain request from the client devices until the network load satisfies another operating metric threshold. In this way, each client device can buffer notifications from the server device in a memory cache of each respective client device. As the client devices attempt to retrieve data from the server device based on the cache of notifications, the server device can bypass fulfilling certain requests from the client devices until certain criteria is satisfied.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
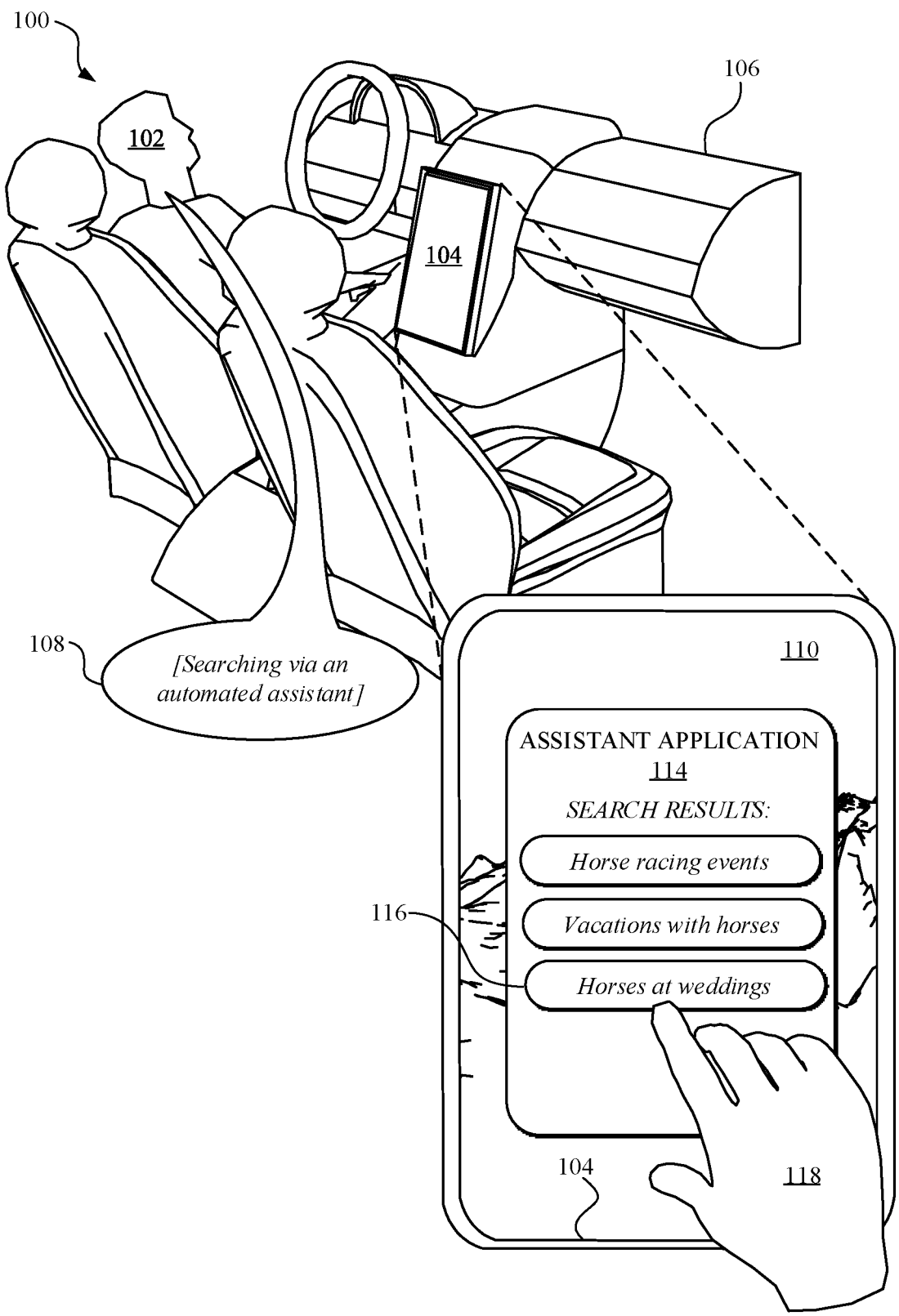
FIG. 1A, FIG. 1B, FIG. 1C, and FIG. 1D illustrate views of instances in which update notifications are provided to client devices of an ecosystem, but any corresponding data is thereafter conditionally provided to each client device.
Figure 1B:
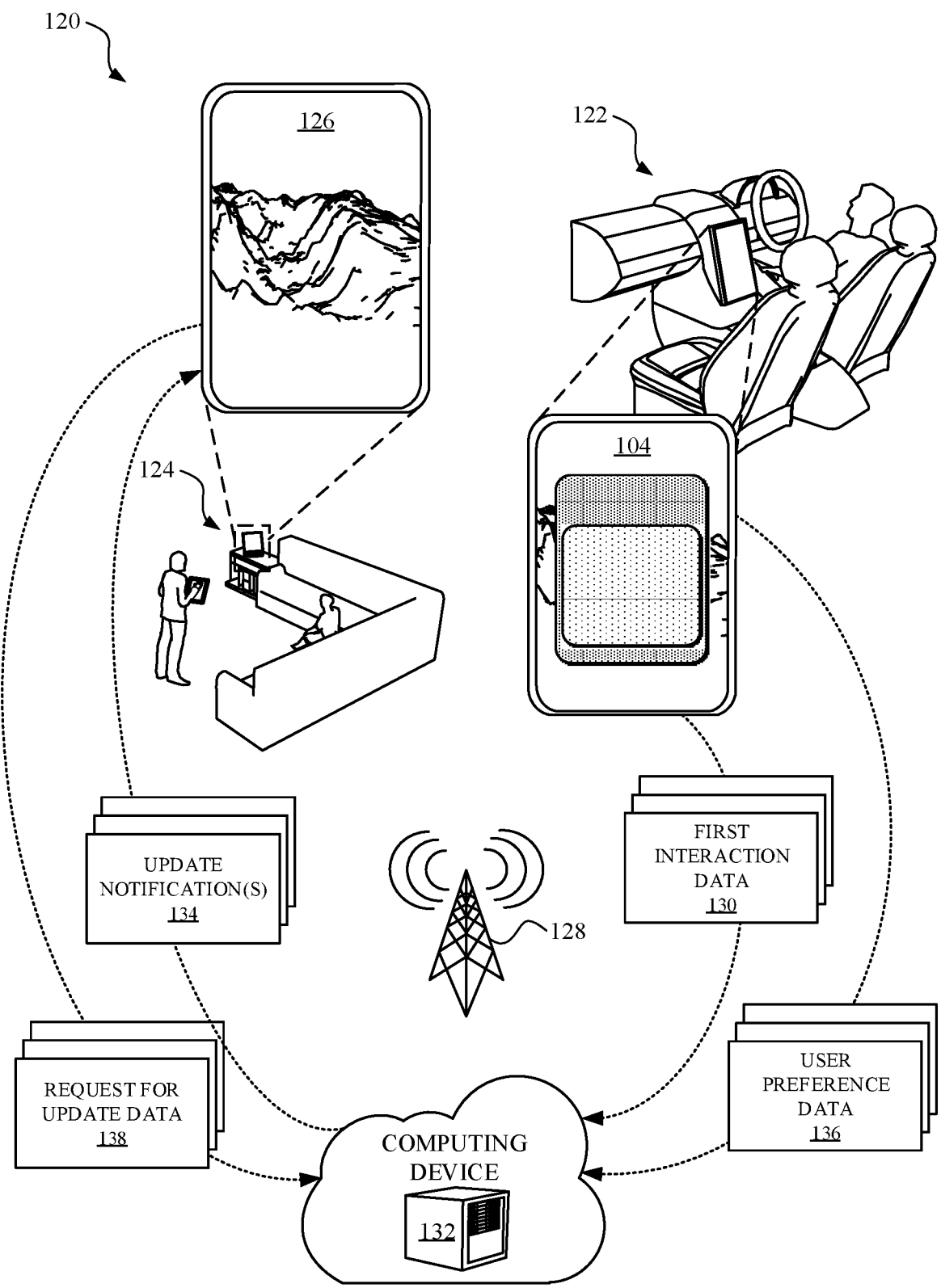
Figure 1C:
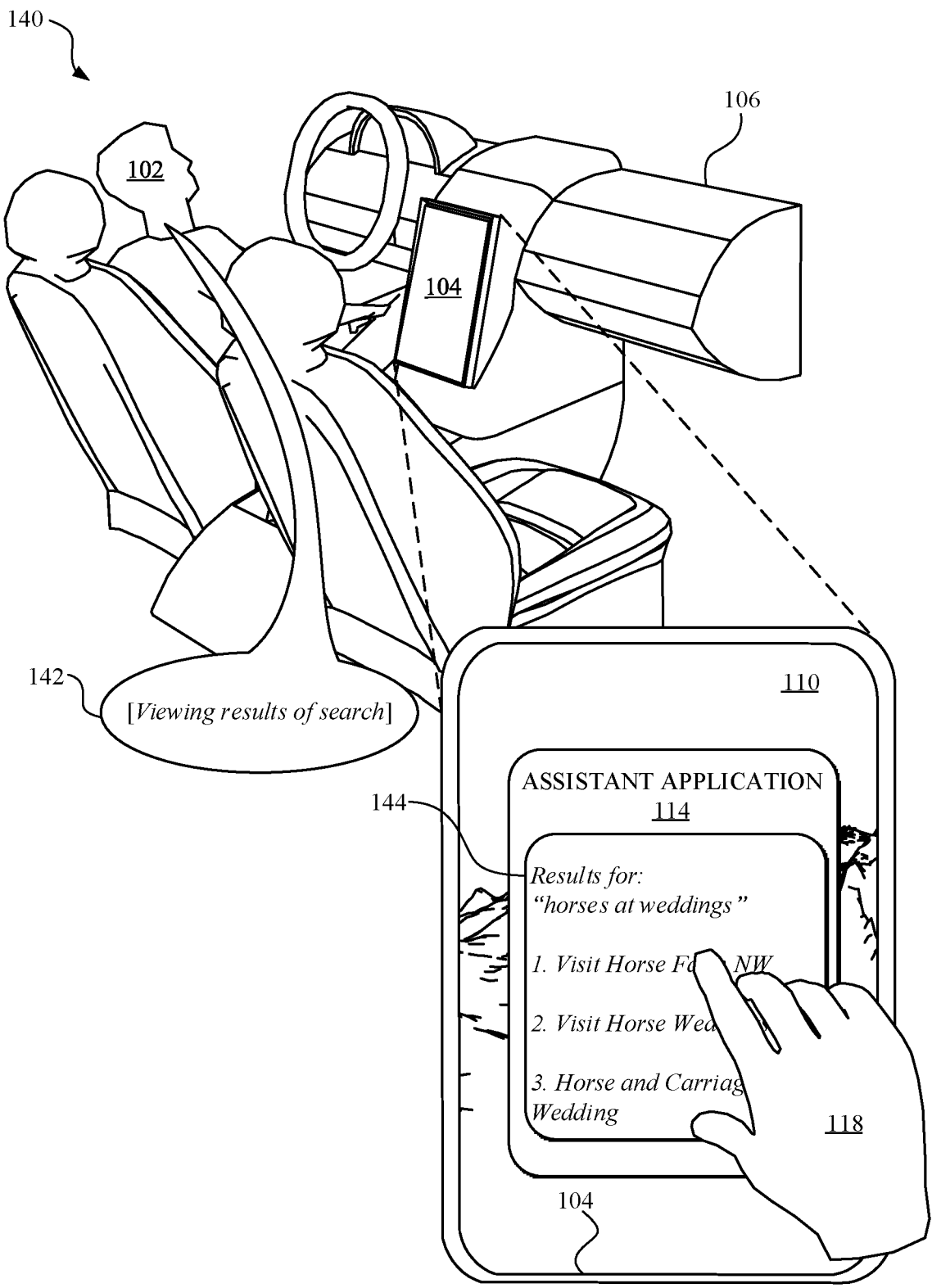

FIG. 1A, FIG. 1B, FIG. 1C, and FIG. 1D illustrate a view 100, a view 120, a view 140, and a view 160 of instances in which update notifications are provided to client devices of an ecosystem, but any corresponding data is thereafter conditionally provided to each client device. As a result, although a client device may receive an update notification from a server device, the server device can limit when the client device will receive the corresponding update according to one or more criteria. For example, when a user 102 is riding in their vehicle 106, the user 102 can interact with an automated assistant via an assistant application 114 of a computing device 104. The vehicle 106 can be temporarily parked while the user 102 initializes an internet search 108 via the automated assistant. Initially, the user 102 can invoke the automated assistant in order to retrieve search results, which can be rendered at a graphical user interface 110 of the computing device 104. The initial search can be, for example, a search for "horse related events" and the search results can be provided based on contextual data that the automated assistant may have access to, in order to refine the search results. In response to receiving the search query, the automated assistant can communicate first interaction data 130 (i.e., user interaction preference data) to a computing device 132, even though the user 102 may not be done searching (e.g., the user may have yet to select a particular search result 116 with their hand 118). In some implementations, a client device 124 can bias ASR and/or NLU processes toward content that is identified in the first interaction data 130, once a corresponding update has been received by the client device 124. In this way, spoken utterances provided by the user 102 to the client device 124 regarding "horse related events" can be more readily understood and responded to by a client automated assistant that is accessible via the client device 124. Alternatively, or additionally, based on the first interaction data 130, the client device 124 can pre-emptively retrieve content for rendering to the user 102 in response to subsequent inputs that may be related to "horse related events."

The computing device 132 can receive the first interaction data 130 during the search session, as well as user preference data 136, which can indicate a change to an assistant setting made by the user 102 while the user was in the vehicle 106. The computing device 132 can receive this data over network 128 and, in response, provide one or more update notifications 134 to one or more other client devices associated with an assistant account managed by the user 102. For example, the user 102 can have a variety of different IoT devices within their home and those devices can provide access to instances of a client automated assistant. A client device 124 can receive the update notifications 134, and in response, provide a request for update data 138 to the computing device 132 or a different server device. In some implementations, the client device 124 can determine whether one or more client conditions are satisfied before providing the request for update data 138. For example, the one or more client conditions can be based on whether the user 102 is able to interact with the client device 124. In this way, when the user 102 is in their vehicle 106 and unable to directly interact with a touch interface 126 of the client device 124, the one or more client conditions may not be satisfied. Therefore, the client device 124 can refrain from immediately requesting updated assistant data in response to receiving the update notifications 134. This can preserve computational resources such as network bandwidth and computational load at the client device 124 and/or the computing device 132.

In some implementations, when the computing device 132 receives the request for update data 138, a computing device 132 can identify one or more characteristics associated with the data being requested and/or the request from the client device 124. These characteristics can be identified in order for the computing device 132 to determine whether one or more criteria are satisfied for providing updated data to various client devices associated with an assistant account of the user 102. For example, in some implementations, the computing device 132 can determine whether an interaction, between the user and the automated assistant that caused the updated data to be available, is continuing or otherwise ongoing. In some implementations, the computing device 132 can determine whether the user 102 has provided one or more inputs to the computing device 104 within a threshold amount of time of a previous input that resulted in the updated data (i.e., operation data). When the computing device 132 determines that no other inputs have been provided to the computing device 104 and/or the automated assistant within the threshold amount of time, the computing device 132 can consider the one or more criteria satisfied. However, if the user 102 has continued to the interaction, the computing device 132 can refrain from providing the updated data to the client devices and therefore consider the one of our criteria to not be satisfied.

Figure 1D:
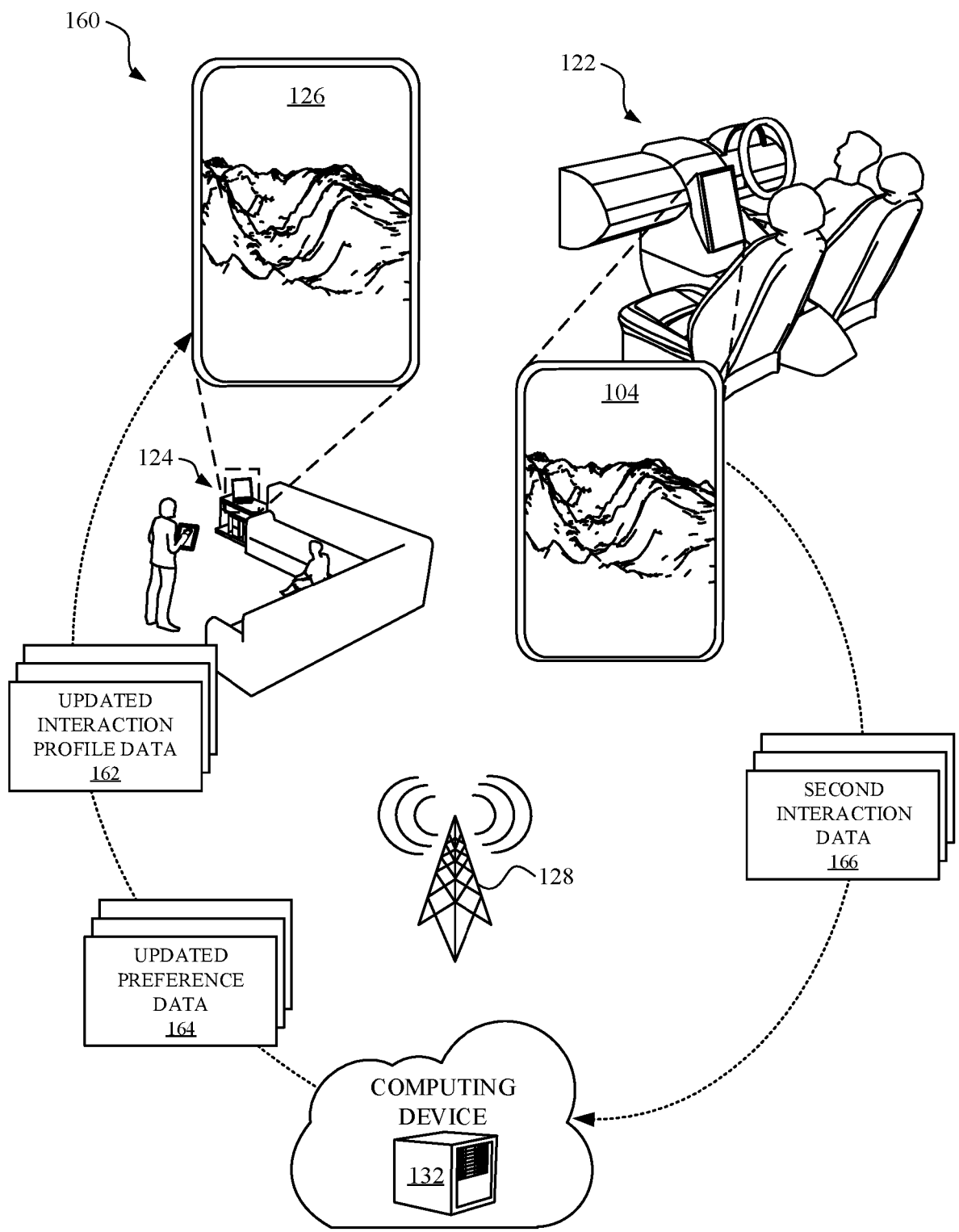

For example, when the user 102 selects the particular search result, an additional interface 144 can be provided at the graphical user interface 110 thereby continuing a search session with the automated assistant in order to view additional search results 142. Because the user has selected the particular search result 116 to view the additional interface 144, second interaction data 166 can be provided to the computing device 132, as illustrated in FIG. 1D. The second interaction data 166 can be different from the first interaction data 130, since the second interaction data 166 is based on more-refined search results and interaction preferences. When the computing device 132 receives the second interaction data 166, the computing device 132 can identify one or more other characteristics associated with the second interaction data. These other characteristics can be identified in order to determine whether one or more criteria are satisfied for notifying the client devices about the second interaction data 166. Alternatively, or additionally, the computing device 132 can provide another notification to the client device 124 in response to receiving the second interaction data 166. This other notification can indicate that the second interaction data 166 has been received at the computing device 132, and the client device 124 can store the other notification in a memory cache with the update notification(s). In response to receiving the other notification, the client device 124 can optionally provide another request to the computing device 132 in order to retrieve the second interaction data 166.

In some implementations, when the second interaction data 166 is available or another request is received from the client device 124, the computing device 132 can determine whether the one or more criteria are satisfied. For example, when the user 102 has not provided an assistant input for a particular amount of time, the computing device 132 can determine that the one or more criteria are satisfied. As a result, a computing device 132 can push updated interaction profile data 162 updated preference data 164 to the client device 124. In some implementations, the computing device 132 can determine that the request for update data 138 is irrelevant and/or outdated because the request for update data 138 identifies the first interaction data 130. However, because the client device 124 has already requested search related data, the computing device can push updated interaction profile data 162 to the client device 124 with or without receiving explicit request that identifies the second interaction data 166. Therefore, although the client device 124 had buffered the previous notification(s), the computing device 132 can determine to bypass responding to requests associated with outdated notifications.

In some implementations, one or more criteria for providing assistant data to client devices can be based on a computational load of the computing device 132 and/or an amount of network bandwidth available to the client device 124 and/or the computing device 132. For example, one or more metrics can characterize one or more features of a computational load have the computing device 132. When the one or more metrics satisfy one or more respective thresholds, the computing device 132 can satisfy one or more pending requests from one or more client devices. In this way, the computing device 132 can notify client devices of an ecosystem associated with an assistant account when certain data becomes available. However, the computing device 132 can conditionally provide the available data to the client devices when certain criteria is satisfied. In some implementations, this can mitigate redundant request fulfillment by allowing the computing device 132 to fulfill a request when there is some amount of confidence that data for fulfilling the request will not become irrelevant or outdated within some amount of time of the data being received by a client device. Alternatively, or additionally, the computing device 132 can mitigate wasting of network resources by establishing a corpus of updated assistant data to provide to find devices, instead of individually providing every instance of updated assistant data. For example, the updated interaction profile data 162 and the updated preference data 164 can be pushed to the client device 124 as a single package or file, instead of providing the updated interaction profile data 162 and updated preference data separately and at supper time.

In some limitations, a heuristic approach and/or one or more trained machine learning models can be employed to determine whether certain data that has become available to the computing device 132 will become the relevant shortly after communicating the data to client devices. For example, characteristic data associated with the creation of certain data can be processed by one or more trained machine learning models in order to estimate the likelihood that the data will be irrelevant and/or outdated within an amount of time of a client device receiving the data. The characteristic data can be based on recent inputs from a user to an automated assistant, interactions between third-party applications and the automated assistant, contextual data that is based on a context in which certain data became available to the computing device 132, and/or any other data that can be associated with the automated assistant. The one or more trained machine learning models can be based on training data generated from previous interactions between a user and an automated assistant.

For example, the training data can indicate that a user typically conducts search sessions for at least some identified minimum amount of time. Therefore, when data characterizing updated interaction preferences of the user is received by the computing device 132, at a time during a search session that is before the expiration of the identified minimum amount of time, the data may not be shared with client devices as a result. Rather, based on the one or more trained machine learning models, the computing device 132 can notify client devices of the updated interaction preferences, but can wait to push the updated interaction preference data to the client devices until the minimum amount of time has expired. Alternatively, or additionally, a taxonomic classification of assistant data available to the computing device 132 can be used to determine whether to immediately push the assistant data to client devices and/or wait before pushing the assistant data to certain client devices. For example, the classifications can include a first classification (e.g., a security classification) corresponding to a first delay period for provisioning a notification and/or assistant data to a client device. Alternatively, or additionally, the classifications can also include a second classification (e.g., a user preference classification) corresponding to a second delay period for provisioning a notification and/or assistant data to the client device. In some implementations, the first delay period is a shorter delay period than the second delay period.

Figure 2:
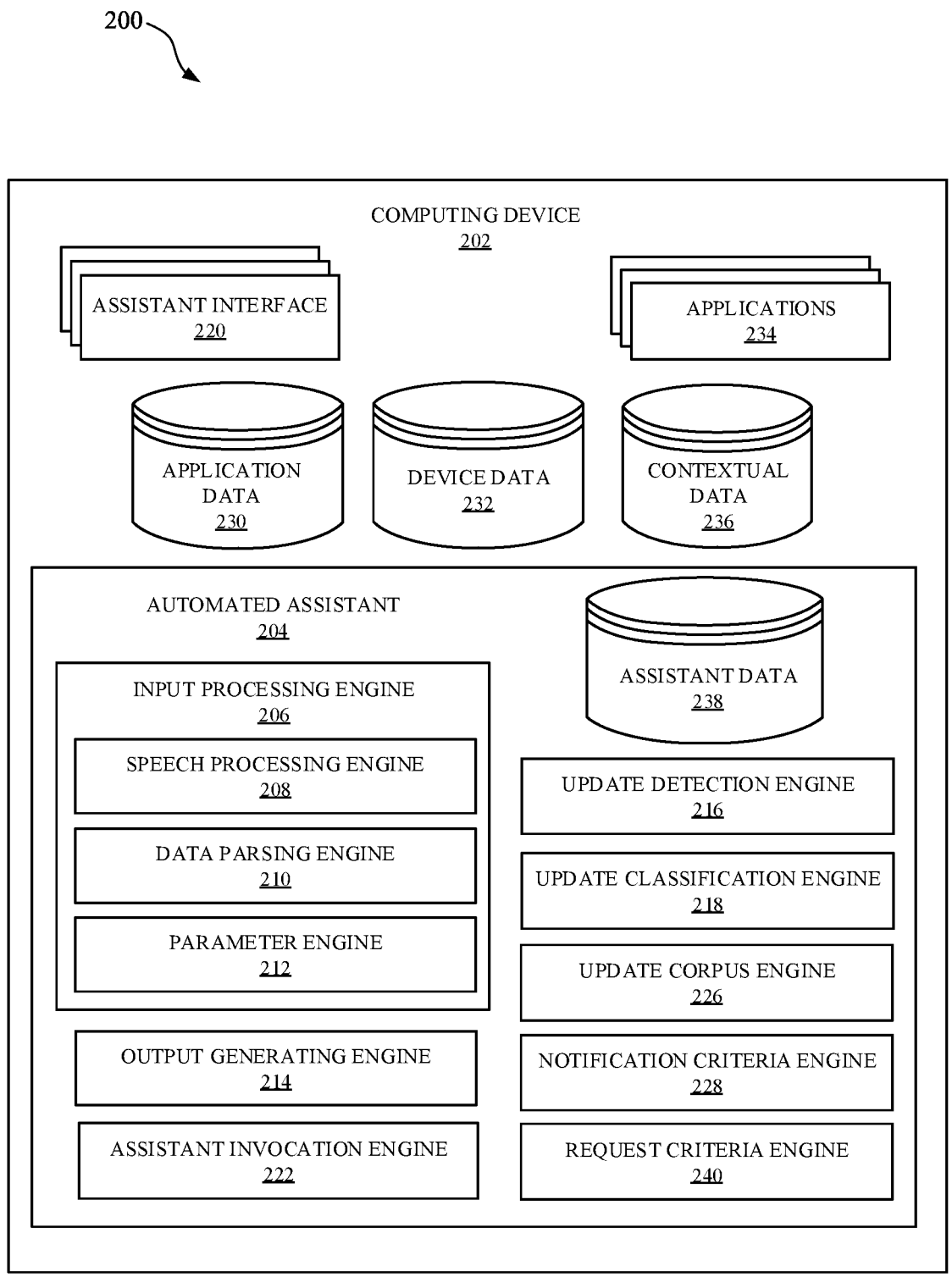
FIG. 2 illustrates a system for conditionally delaying fulfillment of client requests in order to preserve network bandwidth and other resources that may be consumed when an ecosystem of assistant devices are repeatedly pinging servers for updates.

FIG. 2 illustrates a system 200 for conditionally delaying fulfillment of client requests in order to preserve network bandwidth and other resources that may be consumed when an ecosystem of assistant devices are repeatedly pinging servers for updates. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions and/or generate operation data (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states.

The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, the system 200 can include an update detection engine 216 that can determine when updated assistant data 238 is available to the system 200. For example, the update detection engine 216 can determine that one or more inputs to the automated assistant 204 have caused a change to a profile (e.g., a user interaction profile or interest graph) managed by the automated assistant 204. The update detection engine 216 can determine, based on this change, that the profile should be updated for each client device of an ecosystem of client devices that use the profile (e.g., an assistant home profile). The update detection engine 216 can then communicate to one or more engines of the system 200 in order to indicate that the update is available as a basis for providing a notification and/or updated assistant data to each client device.

When the update detection engine 216 determines that updated assistant data is available, the update detection engine 216 can communicate with an update classification engine 218 of the system 200. The update classification engine 218 can classify the update according to one or more classifications, and each classification can be correlated to one or more criteria for communicating the update to the client devices. For example, the update classification engine 218 can classify updated assistant data as corresponding to a classification such as a security update, which can correspond to a highest priority criteria. Therefore, because this updated assistant data satisfies the highest priority criteria, the updated assistant data can be pushed to any available client devices associated with a user account that is affected by the updated assistant data. Alternatively, or additionally, the update classification engine 218 can classify an update as corresponding to a user preference update, which can correspond to criteria that allows the update to be pushed to client devices when certain criteria is satisfied. For example, the user preference data can correspond to criteria such as computational load of the computing device 202 and/or one or more features of a user interaction that resulted in the user preference data. Therefore, when the computational load is at a particular level and/or the user interaction exhibits one or more features (e.g., the interaction has been over for at least a threshold amount of time), the updated user preference data can be pushed to the client devices.

In some implementations, the system 200 can include an update corpus engine 226, which can determine whether particular data should be pushed to client devices as a corpus of various data. For example, while an update to a user interaction preference may qualify as an update that should be pushed to certain client devices, the update corpus engine 226 can determine whether the update should be pushed as a corpus of data. In such instances, the corpus of data can include additional data that can be used by a client device in order to effectively employ the update. For instance, an update to a user interaction preference can indicate categories of content that a user may have recently shown an interest in. However, the update corpus engine 226 can process the updated user interaction preference in order to retrieve supplemental content before pushing a notification and/or updated interaction preference data to the client devices. This can eliminate the need for the client devices to, thereafter, specifically request the supplemental content from the computing device 202 and/or another server device. In this way, there would be a reduced number of network transactions associated with an update as a result of collecting the corpus of data prior to pushing any initial updates and/or notifications.

In some implementations, the system 200 can include a notification criteria engine 228, which can determine whether notification criteria associated with a particular update and/or a particular category is satisfied. In some implementations, the notification criteria engine 228 can determine that, before providing a particular update to client devices of an ecosystem, that one or more inputs to the automated assistant should not have been received from a user within a threshold amount of time. Alternatively, or additionally, the notification criteria engine 228 can determine that, before providing a security update to client devices of an ecosystem, each client device must indicate that they are awake, or not in a sleep state or standby mode (e.g., a mode in which less than a total number of interfaces are operating with a max sampling rate and/or full power). When one or more criteria identified by the notification criteria engine 228 are satisfied for a particular update, the notification criteria engine 228 can cause a notification regarding the particular update to be communicated to the client devices.

In some implementations, the system 200 can include a request criteria engine 240, which can determine whether certain criteria associated with an update is satisfied before fulfilling a request from a client device to provide the update to the client device. For example, when a client device requests a particular update that the client device was notified about, a request from the client device can include metadata associated with the notification. The metadata can include an identifier for the update and/or a timestamp associated with the update. This metadata can be used by the request criteria engine 240 to determine whether certain criteria is satisfied before sending the update to the requesting client device. For example, the computing device 202 can determine, based on the metadata, whether the request from the client device refers to an outdated update. This determination can be based on a timestamp provided in the request and/or one or more other updates that may have become available after a time corresponding to the timestamp. As a result, the request criteria engine 240 can bypass responding to the request from the client device and/or respond to the request with an instance of an identified update that is more recent and/or otherwise not outdated.

Alternatively, or additionally, the request criteria engine 240 can access application data 230, device data 232, and/or contextual data 236 in order to determine whether one or more criteria associated with an update are satisfied. For example, the one or more criteria can include a requirement that a user is within a threshold distance from one or more client devices before a corresponding update can be pushed to the one or more client devices. Therefore, the request criteria engine 240 can process, with prior permission from the user, geolocation data in order to determine whether the user is, or is predicted to be, within a threshold distance from the one or more client devices. In this way, certain updates, such as those related to recommending content, will not be frequently pushed to client devices when a user is not available to view the recommendations. This can preserve computational resources, such as network and processing bandwidth, at the server device (e.g., computing device 202) and/or client devices that are involved in such update transactions.

Figure 3A:
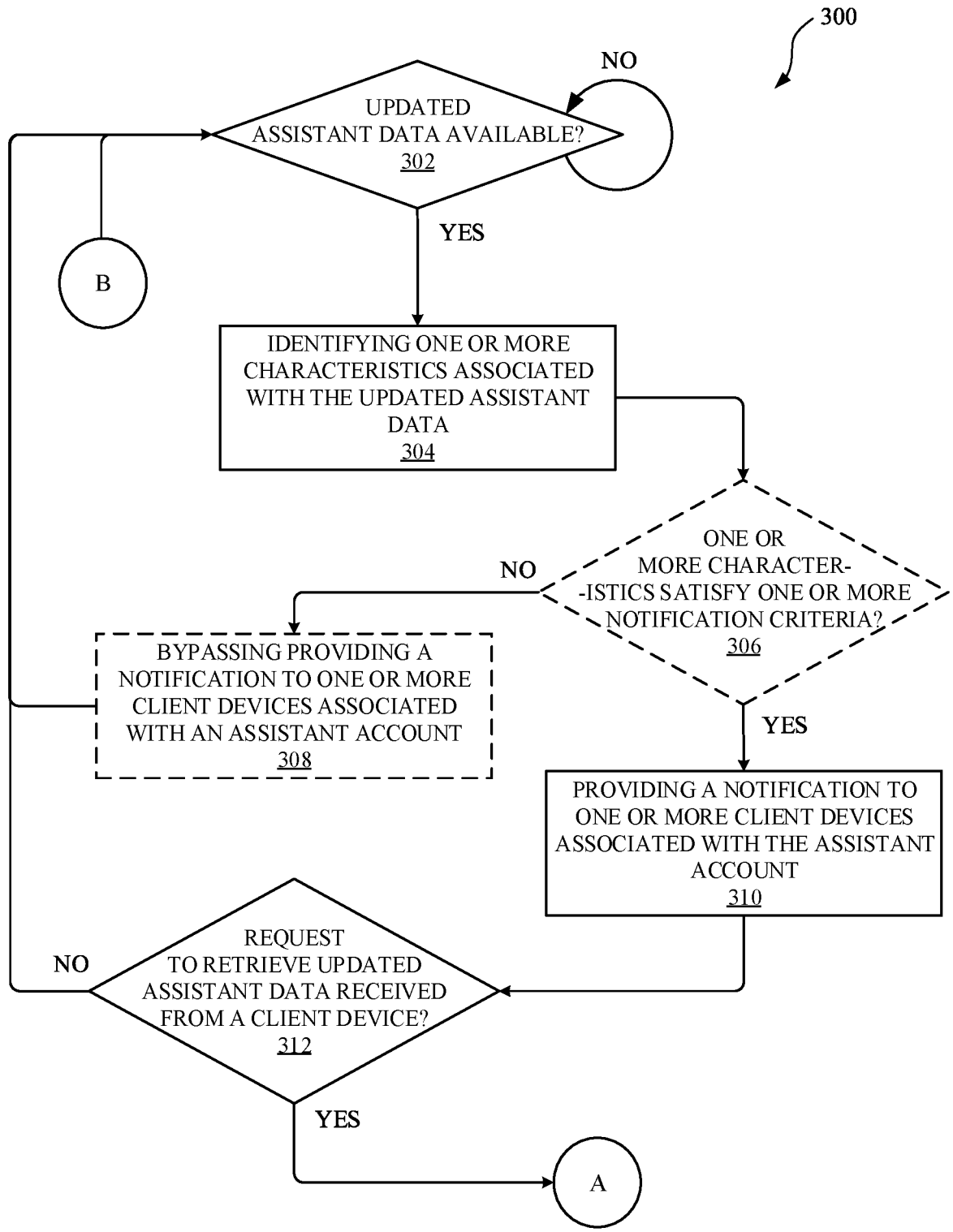
FIG. 3A and FIG. 3B illustrate a method for conditionally providing assistant notifications and assistant data to client devices of an ecosystem of assistant devices.
Figure 3B:
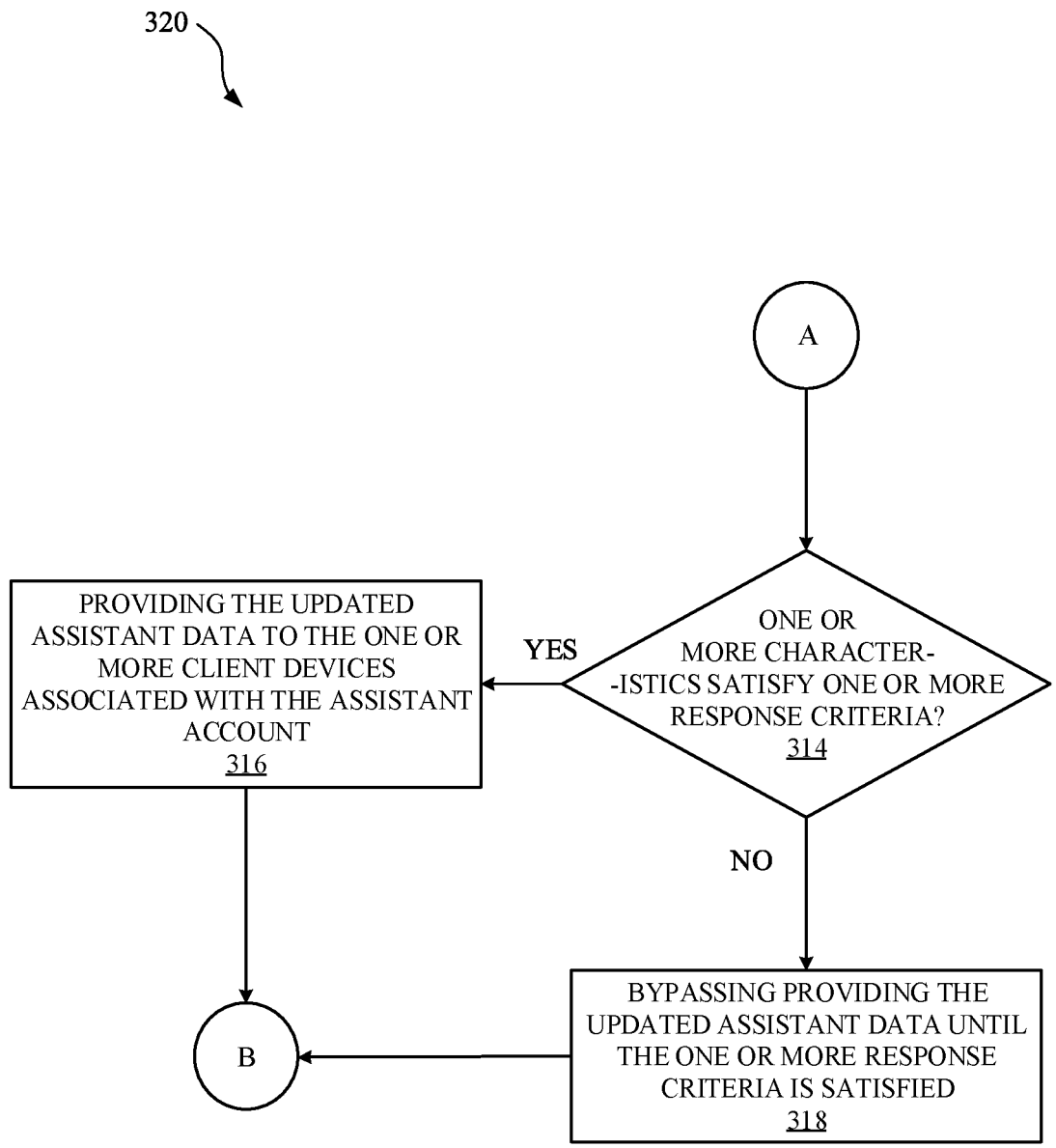

FIG. 3A and FIG. 3B illustrate a method 300 and a method 320 for conditionally providing assistant notifications and assistant data to client devices of an ecosystem of assistant devices. The method 300 and the method 320 can be performed by what are more applications, devices, and/or any other apparatus or module capable of interacting with an automated assistant. The method 300 can include an operation 302 of determining whether updated assistant data is available. The updated assistant data can characterize one or more updates to when one or more features of an automated assistant. An update can be initialized by one or more users and/or one or more entities associated with the automated assistant. For example, a third-party application can communicate with an automated assistant application via an application programming interface in order to provide the automated assistant with data. The data can then be processed by the automated assistant in order to generate updated assistant data. Alternatively, or additionally, updated assistant data can be generated by the automated assistant based on one or more inputs from a user of the automated assistant. For example, the user can provide an input to an interface of a first client device of the ecosystem of assistant devices. In response, the automated assistant can generate updated assistant data that can be utilized by an instance of the automated assistant at a second client device and/or another client device of the ecosystem of assistant devices.

When updated assistant data is determined to be available, the method 300 can continue to an operation 304. Otherwise, the automated assistant can continue to determine whether updated assistant data is available. The operation 304 can include identifying one or more characteristics associated with the updated assistant data. In some implementations, the one or more characteristics can include temporal data that identifies a time that the updated assistant data became available, a time since a previous input from a user, one or more features of an automated assistant operation, a predicted time that a user will provide a subsequent input for initializing an additional operation, the time in which previous assistant data became available, and/or any other temporal aspect of the assistant data. Alternatively, or additionally, the one or more characteristics can characterize a type of data of the assistant data, a size of the assistant data, a relevance of the assistant data to an ongoing interaction, a relevance of the assistant data to a particular client device, and/or any other characteristics that can be associated with assistant data.

The method 300 can proceed from the operation 304 to an optional operation 306, which can include determining whether one or more characteristics satisfy one or more notification criteria. The notification criteria can be established in order to determine when notification regarding updated data should be communicated to client devices of an ecosystem of devices. In some implementations, the notification criteria can be satisfied when the one or more characteristics indicate that the available updated assistant data corresponds to a feature of the automated assistant that the user has previously employed. Alternatively, or additionally, the one or more notification criteria can be satisfied when one or more metrics satisfy one or more metric thresholds associated with the ecosystem of devices. For example, when a metric indicates that a computational load and/or a network load of the ecosystem of devices currently satisfies a particular threshold, the method 300 can proceed to the operation 308.

In some implementations, the notification criteria can refer to whether the available updated data corresponds to a classification that necessitates immediate notification, delayed notification, and/or conditional notification. For example, available updated data that is classified as security data and/or privacy data can satisfy certain notification criteria that can cause the notification to be immediately communicated to one or more client devices. Alternatively, or additionally, available updated data that is classified as user preference data (e.g., an update regarding a preference a user has regarding a particular website and/or store) can be delayed until one or more criteria are satisfied. For example, the criteria can be satisfied when network bandwidth for a client device and/or a server reaches a particular level, and/or when a user has not interacted with an automated assistant for a threshold duration of time (this can limit interruptions to performance during ongoing interactions). Alternatively, or additionally, available updated data that is classified as a third party application update can satisfy certain notification criteria that causes a notification to be provided when one or more conditions are satisfied. For example, a notification regarding available updated data that identifies a recently deployed feature of the third party application can be provided to one or more client devices according to whether the user has accessed or is expected to access the third party application via their automated assistant. In this way, the notification is not immediately provided to an entire ecosystem of client devices without an indication of interest from the user with respect to the third party application.

The operation 308 can be an optional operation that includes bypassing providing a notification to one or more client devices associated with an assistant account. In this way, because each client device may respond to the notification with the request to retrieve the updated assistant data, the server device can limit further burdening the computational load and/or network load of the ecosystem by refraining from providing the notification. The method 300 can then optionally proceed from the operation 308 to the operation 302 and/or the operation 304 for determining whether the one or more characteristics have changed since the operation 308.

When the one or more notification criteria is satisfied and the operation 306 is not performed, the method 300 can proceed to the operation 310, which can include providing a notification to one or more client devices associated with the assistant account. The notification can identify the updated assistant data that is available and/or one or more features of the updated assistant data that is available. For example, the notification can identify a classification of the updated assistant data that is available. The classification can be, but is not limited to, security data, search data, recommended content, third-party data, and/or any other type of data that can be associated with an automated assistant. In some implementations, each client device can determine whether to request the updated assistant data based on the information embodied in the notification.

The method 300 can proceed from the operation 310 to an operation that 312, which can include determining whether a request to retrieve the updated assistant data has been received from a client device associated with the assistant account. When a request to retrieve the updated assistant data has not been received from a client device, the method 300 can proceed to the operation 302 and/or the operation 304. In such instances, the updated assistant data that was previously identified may become outdated as a result of other assistant data that has become available. As a result, the method 300 may continue for the other assisted data, and another notification may be provided to the client devices of the corresponding ecosystem. However, when a request to retrieve the updated assistant data has been received from a client device, the method 300 can proceed from the operation that 312, via continuation element "A," to an operation 314 of method 320 provided in FIG. 3B.

The operation 314 can include determining whether one or more characteristics associated with the updated assistant data satisfy one or more response criteria. The response criteria can be set forth to ensure that data is communicated to client devices of an ecosystem in a way that balances a use of computational resources such as network bandwidth and processing bandwidth. For example, the one or more criteria can be satisfied when an interaction between the user and the automated assistant has been discontinued by the user for a threshold amount of time. Alternatively, or additionally, the one or more criteria can be satisfied when be updated assistant data relates to a type of data that is prioritized over one or more other types of data, thereby ensuring that security updates are quickly provided to client devices while other less prioritize updates can be limited until there is a corpus of data to provide.

For example, when a user interacts with an automated assistant via their cellular phone, an assistant application and/or the operating system can communicate with a server device associated with the automated assistant. When the interaction corresponds to a request for the automated assistant to have a particular behavior during part of the day, (e.g., "assistant, enter a 'do not disturb mode' after 8 PM tonight") the request can be classified as user preference update and can cause the server device to generate updated assistant data. This updated assistant data may not be prioritized when the interaction occurs in the morning of the same day that the user is referring to because of the amount of time before the automated assistant is affected. Rather, the automated assistant can wait until either a later time when the user is done interacting with the automated assistant and/or when there are other updates that can be pushed to the client devices with the update regarding the particular behavior requested by the user. For example, the criteria may not be satisfied at the operation 314 until the user has not interacted with the automated assistant for a threshold amount of time, when a current time is within a threshold amount of time from when the request is going to take effect (e.g., 8 PM, when the 'do not disturb' mode is to take effect), and/or when other data is available for pushing to the client devices of the ecosystem of client devices.

When the one more response criteria are satisfied at the operation 314, the method 320 can proceed to an operation 316. The operation 316 can include providing the updated assistant data to the one or more client devices associated with the assistant account. Otherwise, the method 320 can proceed to an operation 318, which can include bypassing providing the updated system data until the one or more response criteria are satisfied. Thereafter, the method 320 can proceed from the operation 316 or the operation 318, via continuation element "B," to the operation 302 for determining whether the updated assistant data is still available or whether additional updated assistant data is available.

Figure 4:
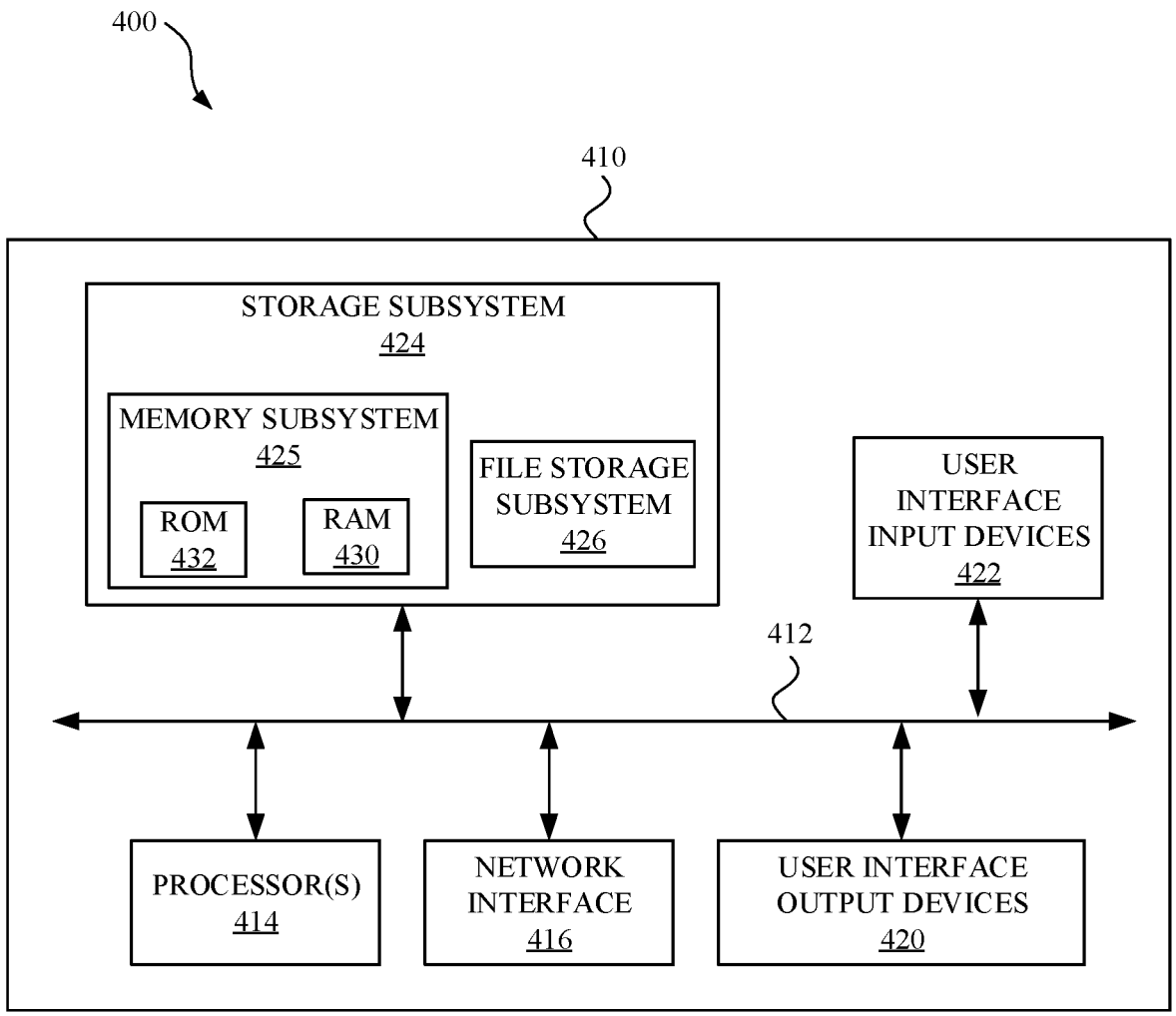
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, method 320, and/or to implement one or more of system 200, computing device 104, client device 124, computing device 132, automated assistant, server device, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as receiving, by a client computing device, a first notification from a server device associated with an assistant account, wherein the first notification indicates that first assistant data is available at the server device. The method can further include an operation of providing, based on the first notification, a request to the server device for accessing the first assistant data, wherein the server device determines to bypass providing the client computing device with access to the first assistant data based on one or more data criteria. The method can further include an operation of receiving, subsequent to receiving the first notification, a second notification from the server device associated with the assistant account, wherein the second notification indicates that second assistant data is available at the server device. The method can further include an operation of providing, based on the second notification, an additional request to the server device for accessing the second assistant data, wherein the server device determines whether to provide the client computing device with access to the second assistant data based on the one or more data criteria. The method can further include an operation of receiving, from the server device, the second assistant data based on the server device determining that the one or more criteria are satisfied.

In some implementations, the method can further include an operation of determining, at the client computing device, whether one or more operating conditions are satisfied prior to providing the request to the server device for accessing the first assistant data, wherein the client computing device provides the request to the server device based on the one or more operating conditions being satisfied. In some implementations, the one or more conditions include an amount of battery charge that is available at the client computing device. In some implementations, the one or more conditions include an amount of network bandwidth that is available to the client computing device. In some implementations, the method can further include an operation of receiving, from the server device, the first assistant data based on the server device determining that the one or more criteria are satisfied, wherein the first assistant data and the second assistant data are received by the client computing device subsequent to the client computing device providing the additional request to the server device.

In some implementations, a method implemented by one or more processors is set forth as including operations such as determining, by a server device, that updated assistant data is available for use by each device of multiple assistant devices of an ecosystem of linked assistant devices, wherein the updated assistant data is based on one or more device interactions involving a user that is associated with the linked assistant devices, and wherein the updated assistant data is usable by a corresponding local automated assistant client of each device of the linked assistant devices of the ecosystem. The method can further include an operation of determining, by the server device and based on one or more characteristics of the updated assistant data, one or more temporal criteria for providing a respective notification to each device of the multiple assistant devices, wherein each respective notification indicates that the updated assistant data is available at the server device. The method can further include an operation of providing, by the server device and based on the one or more temporal criteria, each respective notification to each device of the linked assistant devices of the ecosystem. The method can further include an operation of receiving, by the server device and responsive to providing the respective notifications, a request from an assistant device of the linked assistant devices, wherein the request identifies notification data corresponding to the respective notification received by the assistant device. The method can further include an operation of providing, by the server device and responsive to receiving the request, the updated assistant data to the assistant device of the linked assistant devices, wherein providing the updated assistant data causes the assistant device of the linked assistant devices to locally store the updated assistant data, and wherein the corresponding local automated assistant client of the assistant device utilizes the updated assistant data in generating automated assistant output.

In some implementations, determining the one or more temporal criteria for providing a respective notification to each device of the multiple assistant devices includes: determining a current computational load or a predicted computational load at the server device. In some implementations, determining the one or more temporal criteria for providing a respective notification to each device of the multiple assistant devices includes: determining whether a previous notification has been communicated within a time interval specified by a user interaction preference. In some implementations, the method can further include an operation of determining, responsive to receiving the request, to provide the updated assistant data responsive to receiving the request, wherein determining to provide the updated assistant data is based on the notification data, included in the request, corresponding to the updated assistant data.

In some implementations, determining to provide the updated assistant data responsive to receiving the request includes: verifying, at the server device, that the updated assistant data is not superseded by additional updated assistant data. In some implementations, the one or more characteristics of the updated assistant data, on which the one or more temporal criteria are based, include a taxonomic classification of the updated assistant data. In some implementations, wherein the temporal criteria provides for a first delay period when provisioning notifications that have a corresponding taxonomic classification is a security classification, and wherein the first delay period is shorter than a second delay period corresponding to a non-security classification.

In yet other implementations, a method implemented by one or more processors is set forth as including operations such as determining, at a server device, whether assistant data satisfies one or more criteria for communicating the assistant data to a client device, wherein the one or more criteria are based on one or more features of data that can be utilized by a client automated assistant that is accessible via a client device. The method can further include an operation of, when the one or more criteria are determined to be satisfied: providing, by the server device, a notification to the client device regarding the assistant data, wherein the notification indicates that the assistant data is available at the server device for use by the client automated assistant. The method can further include an operation of, when the one or more criteria are determined to not be satisfied, processing, by the server device, additional assistant data that is based on a subsequent interaction between a user and the client automated assistant, wherein the subsequent interaction caused the additional assistant data to be generated. The method can further include an operation of determining, by the server device, that the additional assistant data satisfies the one or more criteria. The method can further include an operation of providing, to the client device, a separate notification indicating that the additional assistant data is available at the server device, wherein the additional assistant data is different from the assistant data and the additional assistant data is based on one or more user inputs provided to the client automated assistant during the subsequent interaction.

In some implementations, determining that the additional assistant data satisfies the one or more criteria includes determining that the additional assistant data became available to the server device within a threshold amount of time of the assistant data becoming available to the server device. In some implementations, the threshold amount of time is selected according to a type of assistant data corresponding to the assistant data and the additional assistant data. In some implementations, the type of assistant data corresponds to security data that characterizes one or more security preferences of the user, and the one or more user inputs provided to the client automated assistant during the subsequent interaction indicated a modification to the one or more security preferences of the user. In some implementations, the assistant data characterizes content for recommending to the user via an interface of the client device and the additional assistant data characterizes other content for recommending to the user via the interface of the client device.

In yet other implementations, a method implemented by one or more processors is set forth as including operations such as determining, by a server device, that an instance of a client automated assistant has performed an operation that caused operation data to be generated, wherein a client device provides access to the instance of the client automated assistant and the instance of the client automated assistant is associated with an assistant account. The method can further include an operation of processing, at the server device, the operation data to determine whether one or more features of the operation data satisfy one or more criteria for communicating a notification to another client device regarding the operation data, wherein the other client device provides access to a separate instance of the client automated assistant that is associated with the assistant account. The method can further include an operation of, when the server device determines that the one or more features of the operation data do not satisfy one or more criteria for communicating the notification to the other client device, determining, subsequent to performance of the operation, that the instance of the client automated assistant has performed another operation that is associated with the operation data. The method can further include an operation of processing, based on the other operation, additional operation data that has one or more other features that satisfy the one or more criteria for communicating a separate notification to the other client device. The method can further include an operation of providing, based on the additional operation data, the separate notification to the other client device, wherein the separate notification characterizes the other operation performed by the client automated assistant.

In some implementations, processing the additional operation data that has the one or more other features that satisfy the one or more criteria includes determining that, within a threshold amount of time of the client automated assistant performing the other operation, a user has not provided an input for causing the client automated assistant to initialize performance of an additional operation. In some implementations, the method can further include an operation of, when the server device determines that the one or more features of the operation data do not satisfy one or more criteria for communicating the notification to the other client device, receiving, from the other client device, a request for the server device to provide the additional operation data to the other client device, wherein the request is received from the other client device subsequent to providing the separate notification to the other client device, and wherein the additional operation data is provided to the other client device without providing the operation data to the other client device.

In some implementations, processing the operation data to determine whether the one or more features of the operation data satisfy the one or more criteria includes: determining whether the operation data corresponds to a type of data that is prioritized over one or more other types of data that are accessible to the client automated assistant. In some implementations, the type of data includes security preference data that is prioritized over the one or more other types of data that include search preference data. In some implementations, the operation data characterizes an interaction between the client automated assistant and a user. In some implementations, processing the operation data to determine whether the one or more features of the operation data satisfy one or more criteria includes: determining that the interaction between the client automated assistant and the user is ongoing, wherein the one or more criteria are not satisfied when the interaction between the client automated assistant and the user is ongoing. In some implementations, processing the operation data to determine whether the one or more features of the operation data satisfy the one or more criteria includes: determining whether the server device is operating according to an operating metric that satisfies an operating metric threshold, wherein the one or more criteria are satisfied when the operating metric satisfies the operating metric threshold. In some implementations, the operating metric characterizes an amount of network bandwidth that is currently available to the server device or is predicted to be available at the server device after communicating the notification to the other client device.

We claim:

1. A method implemented by one or more processors, the method comprising:
   determining, by a server device, that updated assistant data is available for use by each device of multiple assistant devices of an ecosystem of linked assistant devices,
      wherein the updated assistant data is based on one or more device interactions involving a user associated with the linked assistant devices, and
      wherein the updated assistant data is usable by a corresponding local automated assistant client of each device of the linked assistant devices of the ecosystem and modifies the output of the multiple assistant devices in response to a spoken utterance;
   determining, by the server device and based on one or more characteristics of the updated assistant data, one or more temporal criteria for providing a respective notification to each device of the multiple assistant devices,
      wherein each respective notification indicates that the updated assistant data is available at the server device;
   determining, by the server device and prior to providing a respective notification indicating that the updated assistant data is available, that the updated assistant data is superseded by additional updated assistant data,
   providing, by the server device and based on the one or more temporal criteria and determining that the updated assistant data is superseded by the additional updated assistant data, a respective notification indicating that the additional updated assistant data is available to each device of the linked assistant devices of the ecosystem;
   receiving, by the server device and responsive to providing the respective notifications, a request from an assistant device of the linked assistant devices,
      wherein the request identifies notification data corresponding to the respective notification received by the assistant device; and
   providing, by the server device and responsive to receiving the request, the additional updated assistant data to the assistant device of the linked assistant devices,
      wherein providing the updated assistant data causes the assistant device of the linked assistant devices to locally store the additional updated assistant data, and
      wherein the corresponding local automated assistant client of the assistant device utilizes the additional updated assistant data in generating automated assistant output in response to a spoken utterance of the user.

2. The method of claim 1, wherein determining the one or more temporal criteria for providing a respective notification to each device of the multiple assistant devices includes:
   determining a current computational load or a predicted computational load at the server device.

3. The method of claim 1, wherein determining the one or more temporal criteria for providing a respective notification to each device of the multiple assistant devices includes:
   determining one or more of the temporal criteria are satisfied based on a previous notification being communicated within a time interval specified by a user interaction preference.

4. The method of claim 1, further comprising:
   determining, responsive to receiving the request, to provide the updated assistant data responsive to receiving the request,
      wherein determining to provide the updated assistant data is based on the notification data, included in the request, corresponding to the updated assistant data.

5. The method of claim 1, wherein determining to provide the additional updated assistant data responsive to receiving the request includes:
   determining, at the server device, the updated assistant data is rendered irrelevant by the additional updated assistant data.

6. The method of claim 1, wherein the one or more characteristics of updated assistant data, on which the one or more temporal criteria are based, include a taxonomic classification of updated assistant data.

7. The method of claim 6,
   wherein the temporal criteria provide for a first delay period when provisioning notifications that have a corresponding taxonomic classification is a security classification, and
   wherein the first delay period is shorter than a second delay period corresponding to a non-security classification.

8. A method implemented by one or more processors, the method comprising:
   determining, at a server device, whether assistant data satisfies one or more criteria for communicating the assistant data to a client device,
      wherein assistant data is based on one or more device interactions involving a particular user of multiple linked assistant devices, the particular user having a user profile which is modified by the assistant data, and
      wherein the one or more criteria are based on one or more features of data that are determined, prior to receiving a request associated with the updated assistant data from an assistant device of the linked assistant devices, to be utilizable by a client automated assistant that is accessible via a client device;
   when the one or more criteria are determined to be satisfied:
      providing, by the server device, a notification to the client device regarding the assistant data,
         wherein the notification indicates that the assistant data is available at the server device for use by the client automated assistant; and
   when the one or more criteria are determined to not be satisfied:
      processing, by the server device, additional assistant data that is based on a subsequent interaction between the particular user and the client automated assistant,
         wherein the subsequent interaction caused the additional assistant data to be generated and modifies the profile of the particular user;
      determining, by the server device, that the additional assistant data satisfies the one or more criteria; and
      providing, to the client device, a separate notification indicating that the additional assistant data is available at the server device,
         wherein the additional assistant data is different from the assistant data and the additional assistant data is further based on one or more user inputs provided to the client automated assistant during the subsequent interaction, and the additional assistant data modifies the output of the client device in response to a spoken utterance.

9. The method of claim 8, wherein determining that the additional assistant data satisfies the one or more criteria includes:
- determining that the additional assistant data became available to the server device within a threshold amount of time of the assistant data becoming available to the server device.

10. The method of claim 9, wherein the threshold amount of time is selected according to a type of assistant data corresponding to the assistant data and the additional assistant data.

11. The method of claim 10,
- wherein the type of assistant data corresponds to security data that characterizes one or more security preferences of the user, and
- wherein the one or more user inputs provided to the client automated assistant during the subsequent interaction indicated a modification to the one or more security preferences of the user.

12. The method of claim 8, wherein the assistant data characterizes content for recommending to the user via an interface of the client device and the additional assistant data characterizes other content for recommending to the user via the interface of the client device.

13. A method implemented by one or more processors, the method comprising:
- determining, by a server device, that an instance of a client automated assistant has performed an operation that caused operation data to be generated,
  - wherein operation data is based on one or more device interactions involving a particular user of multiple linked assistant devices, the particular user having a user profile which is modified by the operation data, and
  - wherein a client device provides access to the instance of the client automated assistant and the instance of the client automated assistant is associated with an assistant account;
- processing, at the server device, the operation data to determine whether one or more features of the operation data satisfy one or more criteria for communicating a notification to another client device regarding the operation data,
  - wherein the one or more criteria include a determination, at the server device and prior to providing the operation data, that the operation data is not superseded by other operation data,
  - wherein the other client device provides access to a separate instance of the client automated assistant that is associated with the assistant account;
- when the server device determines that the one or more features of the operation data do not satisfy one or more criteria for communicating the notification to the other client device:
  - determining, subsequent to performance of the operation, that the instance of the client automated assistant has performed another operation that is associated with the operation data;
  - processing, based on the other operation, additional operation data that has one or more other features that satisfy the one or more criteria for communicating a separate notification to the other client device; and
  - providing, based on the additional operation data which modifies the output of the other client device in response to a spoken utterance and modifies the profile of the particular user, the separate notification to the other client device,
    - wherein the separate notification characterizes the other operation performed by the client automated assistant.

14. The method of claim 13, wherein processing the additional operation data that has the one or more other features that satisfy the one or more criteria includes:
- determining that, within a threshold amount of time of the client automated assistant performing the other operation, a user has not provided an input for causing the client automated assistant to initialize performance of an additional operation.

15. The method of claim 13, further comprising:
- when the server device determines that the one or more features of the operation data do not satisfy one or more criteria for communicating the notification to the other client device:
  - receiving, from the other client device, a request for the server device to provide the additional operation data to the other client device,
    - wherein the request is received from the other client device subsequent to providing the separate notification to the other client device, and
    - wherein the additional operation data is provided to the other client device without providing the operation data to the other client device.

16. The method of claim 13, wherein processing the operation data to determine whether the one or more features of the operation data satisfy the one or more criteria includes:
- determining whether the operation data corresponds to a type of data that is prioritized over one or more other types of data that are accessible to the client automated assistant.

17. The method of claim 16, wherein the type of data includes security preference data that is prioritized over the one or more other types of data that include search preference data.

18. The method of claim 13,
- wherein the operation data characterizes an interaction between the client automated assistant and a user, and
- wherein processing the operation data to determine whether the one or more features of the operation data satisfy one or more criteria includes:
  - determining that the interaction between the client automated assistant and the user is ongoing,
    - wherein the one or more criteria are not satisfied when the interaction between the client automated assistant and the user is ongoing.

19. The method of claim 13, wherein processing the operation data to determine whether the one or more features of the operation data satisfy the one or more criteria includes:
- determining whether the server device is operating according to an operating metric that satisfies an operating metric threshold,
  - wherein the one or more criteria are satisfied when the operating metric satisfies the operating metric threshold.

20. The method of claim 19, wherein the operating metric characterizes an amount of network bandwidth that is currently available to the server device or is predicted to be available at the server device after communicating the notification to the other client device.

\* \* \* \* \*